(No Model.)
A. A. PINDSTOFTE.
FILTER.
No. 550,058.    Patented Nov. 19, 1895.
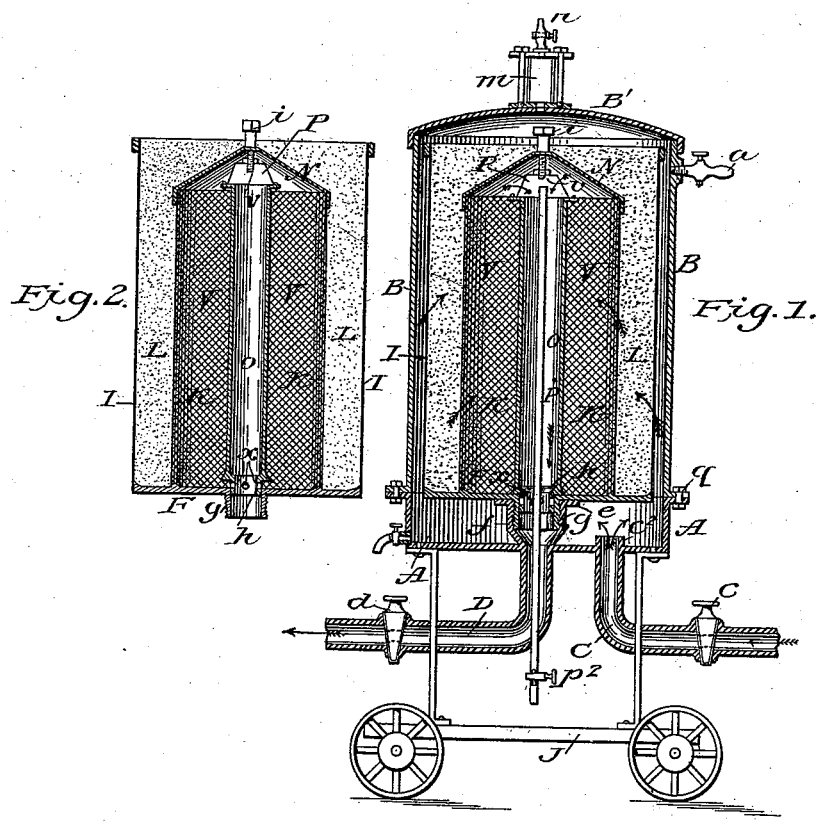
Witnesses.
H. J. Morgan
Jos. S. Lockwood.
Inventor.
A. A. Pindstofte
By A. P. Thayer
atty.

UNITED STATES PATENT OFFICE.

ANDERS ANDERSEN PINDSTOFTE, OF COPENHAGEN, DENMARK.

FILTER.

SPECIFICATION forming part of Letters Patent No. 550,058, dated November 19, 1895.

Application filed May 11, 1893. Serial No. 473,886. (No model.)

*To all whom it may concern:*

Be it known that I, ANDERS ANDERSEN PINDSTOFTE, a subject of the King of Denmark, residing at Copenhagen, in the Kingdom of Denmark, have invented certain new and useful Improvements in Filters; and I do hereby declare the following to be a full, clear, and exact description of the invention, such as will enable others skilled in the art to which it appertains to make and use the same.

My invention relates to filtering apparatus for liquid substances generally, but more particularly applicable for filtering petroleum; and it consists, essentially, of a filtering medium, as sand and the like, confined between vertical reticulated partitions inclosing an inner space to which the liquid flows through the said medium horizontally, in which space provision is made for the discharge of the liquid from the upper part through the bottom of the apparatus, so that a high level of the liquid in said space causes more equal distribution of the liquid being filtered through the filtering medium, all as hereinafter fully described, reference being made to the accompanying drawings, in which—

Figure 1 is a sectional elevation of my improved filtering apparatus complete. Fig. 2 is a like section of the interior apparatus separated from the inclosing case.

A represents the base, B the intermediate portion, and B' the cover, of an upright inclosing case, preferably of circular form, but may be of prismatic or other approved shape in cross-section and preferably made with a flange-joint at $q$, connecting the base and the lower end of the middle portion detachably by means of bolts. The cover is also to be detachably connected.

F represents a plate of like form in outline as the form of the cross-section of the inclosing case, but somewhat less in diameter, which plate is supported about on the level with the top of the base A, preferably on the top flange $e$ of a vertical and enlarged inner upward extension $f$ of the outlet-pipe D for the filtrate, which pipe is located at the center of plate F and is in this example formed integral with the bottom plate of the base A, but may be otherwise connected, if desired.

The plate F has a downwardly-extended central nozzle $g$, which is preferably screwed into the extension $f$ of the outlet-pipe, both of said parts being properly screw-threaded therefor, so as to make a water-tight joint.

A crib of reticulated material, as the outer shell I and the inner shell K, of woven wire or other approved material, is supported on the marginal portion of plate F, being in like form of cross-section as the inclosing case, but smaller and of different sizes, respectively, and providing an annular space, which is filled with sand L or other approved filtering material, and shell K, which is shorter than shell I, has a conical cover N, which is also preferably covered with the filtering material. The shell K, its cover N, and the inner portion of the bottom plate F inclose a space V, in the center of which is a vertical standpipe O, forming an extension of the discharge-pipe nearly to the top of said space and is there connected by the yoke P with the stem $v$ of a handle $i$, extending through cover N for lifting the pipe O, which at its lower end has a shouldered and perforated slip-joint extension $h$, entering the nozzle $g$ and being a valved connection with the discharge-pipe to cause the escape of the filtrate over the top of pipe O to equalize the distribution of the liquid through the filtering material and to be lifted by the handle $i$ when it is desired to draw off the filtrate from chamber V to wash out any precipitate that may collect therein, which then escapes through the perforations of part $h$ of the stand-pipe. The yoke P acts against the cover N as a stop to prevent lifting part $h$ entirely out of the nozzle $g$, which would make difficulty in entering it again in the existing conditions.

P' is a vent-pipe for the escape of air when first charging the filter. It is inserted through the elbow of the discharge-pipe D and is provided with a stop-cock $P^2$ to close it when required.

$m$ is a glass gage on the cover B' to show when the filter is charged full of water. It also has a stop-cock $n$ for venting off the air.

C is the inlet-pipe.

$b$ is a cock for opening from time to time to wash out the precipitate in the base A of the case and is especially useful for drawing off the water always more or less present in petroleum and separating therefrom in the base.

The inlet-pipe C is extended at $c^2$ above the bottom of base A for discharging the incoming liquid above the precipitate collected on the bottom. A cock $a$ is also provided at the upper part of the inclosing case for venting off the air, if required.

The supply and discharge pipes are provided with stop-cocks $c$ $d$, respectively, the use of which is obvious.

In this example I have represented the apparatus as mounted on a truck J for portability; but it may of course have any other desired support.

For changing the filter, to begin with cocks $c$, $n$, and $p^2$ are opened; also $a$, if desired, cocks $b$ and $d$ being closed. The liquid then enters through pipe C until it shows at $a$ or in the glass gage $m$. Cocks $a$ and $n$ are then closed. The liquid then percolates through the filtering material and fills space V, the air escaping therefrom through cock $P^2$. Then cock $d$ is opened and the operation then goes on in due course, any gases that may be evolved escaping through cock $P^2$. The cock $b$ is opened from time to time to wash out the precipitate from the base A. In this operation cock $c$ may be closed, if desired, and vent $a$ or $n$ opened. The outside shell I of the crib will then be washed down.

When the interior space V is to be washed out, cock $c$ is closed. Cover B' is removed and pipe O is lifted by the handle $i$, so as to open perforations $x$ for the escape of the water in said space directly into discharge-pipe D.

It will be seen that the conditions causing the percolation of the liquid laterally through the filtering medium and about uniformly along it from bottom to top facilitate very efficient action.

I claim—

The combination in a filter, of the inclosing case consisting of the base portion, middle section, and cover, detachably connected together, the vertical reticulated crib, a filtering medium contained in said crib, the receiving chamber below the filtering medium, and the exterior chamber thereto inclosed by said case, the interior chamber into which the liquid percolates from the filtering material the cover to said interior chamber, the stand pipe in said chamber having the valved connection with the discharge pipe at the bottom of said interior chamber, and the lifting handle to said stand pipe extending through said cover to the interior chamber substantially as described.

In testimony whereof I affix my signature in presence of two witnesses.

ANDERS ANDERSEN PINDSTOFTE.

Witnesses:
LAURITZ NIELSEN,
CHRISTIAN LARSEN.